United States Patent [19]

Palermiti et al.

[11] 4,342,043

[45] Jul. 27, 1982

[54] SHEET FEEDING FOR A FACSIMILE SYSTEM WITH ANTI-STATIC ELECTRICITY ADDITIVE

[75] Inventors: Frank M. Palermiti, Maitland; Ronald F. Schley, Ocoee, both of Fla.

[73] Assignee: Exxon Research & Engineering Co., Florham Park, N.J.

[21] Appl. No.: 120,336

[22] Filed: Feb. 11, 1980

[51] Int. Cl.$^3$ .............................................. G01D 15/08

[52] U.S. Cl. ...................................... 346/163; 271/18; 346/76 R; 346/135.1; 355/14 SH; 361/214; 358/296

[58] Field of Search .................... 361/214; 355/14 SH; 271/264, 18; 346/163, 76 R, 135.1; 358/296

[56] References Cited

U.S. PATENT DOCUMENTS

| | | | |
|---|---|---|---|
| 2,458,981 | 1/1949 | Cotherman | 361/214 |
| 2,962,382 | 11/1960 | Ives | 346/135.1 |
| 3,008,851 | 11/1961 | Shimger | 427/389 |
| 3,011,918 | 12/1961 | Silvermail | 346/135.1 |
| 3,164,481 | 1/1965 | Shibe | 432/108 |
| 3,344,044 | 9/1967 | Grodsten | 204/2 |
| 3,368,918 | 2/1968 | Miro | 346/163 |
| 3,479,215 | 11/1969 | Cavagra | 428/342 |
| 3,511,700 | 5/1970 | Miro | 428/206 |
| 3,766,156 | 10/1973 | Kine | 432/108 |
| 3,920,873 | 11/1975 | Diamond | 346/163 |
| 3,933,779 | 1/1976 | Baron | 260/93.5 A |
| 3,991,256 | 11/1976 | Cornier | 428/514 |
| 4,035,244 | 7/1977 | Ingue | 346/165 |
| 4,067,780 | 1/1978 | Fujiwara | 204/2 |
| 4,073,585 | 2/1978 | Kobayashi | 355/14 SH |
| 4,130,852 | 12/1978 | Peffer | 361/214 |

FOREIGN PATENT DOCUMENTS

| | | | |
|---|---|---|---|
| 1423403 | 2/1976 | United Kingdom | 358/300 |

*Primary Examiner*—Bernard Konick
*Assistant Examiner*—Alan Faber
*Attorney, Agent, or Firm*—Norman L. Norris; John W. Caldwell

[57] ABSTRACT

A system for reliably feeding individual sheets of recording media is disclosed especially as such system is related to media suitable for electrosensitive recording such as in a facsimile or other device. According to a preferred embodiment, such system may comprise scanning means; sheet storage means; a stack of sheets in said storage means; sheet separating means adapted to successively contact the uppermost of said sheets in said stack as said uppermost sheets are removed from said stack, said separating means including a surface in frictional engagement with an uppermost sheet surface of said stack; drive means for moving said surface in a direction substantially parallel to the sheets in said stack so as to pull each of said uppermost sheets from said stack in a direction generally parallel with the uppermost sheet in said stack, said pulling force being substantially equal on each of the uppermost sheets and sufficient to overcome the frictional force between the uppermost sheets and the sheets beneath the uppermost sheets; each of said sheets in said stack carrying an antistatic electricity additive for substantially minimizing the electrostatic attractive force between said sheets so as to substantially equalize said pulling force required to separate the uppermost sheets from the sheets beneath regardless of atmospheric conditions; and means for transporting said sheets from said storage means to said scanning means.

10 Claims, 4 Drawing Figures

SHEET FEEDING FOR A FACSIMILE SYSTEM WITH ANTI-STATIC ELECTRICITY ADDITIVE

BACKGROUND OF THE INVENTION

This invention relates to a system for reliably feeding individual sheets from a stack along a transport path including sheets of paper of the type utilized in a facsimile apparatus. In order to reliably feed sheets of paper, it is necessary to contend with a variety of conditions including widely varying humidities. In extremely low humidity conditions, triboelectric charges can make it extremely difficult to reliably separate a sheet-at-a-time from a stack of sheets. Static electricity also creates significant difficulties in feeding individual sheets along a transport path containing nonconducting or plastic components.

In copending application Ser. No. 120,337, which is incorporated herein by reference, a facsimile apparatus is disclosed which requires sheet feeding of facsimile copy paper from a stack in an automatic or unattended manner and feeding of individual sheets along a transport path extending from the stack to a scanning area comprising a rotatable drum. Because this apparatus is intended to operate in an automatic or unattended mode, it becomes extremely important that the sheet feeding occur with reliability since there is no operator present to correct non-feeds and misfeeds of the facsimile paper.

The most commonly utilized facsimile copy paper utilized in apparatus of the type disclosed in the aforesaid copending application Ser. No. 120,337 is electronsensitive paper which is formulated so as to develop a coloration or other marking upon the passage of electric current through the paper. Electrosensitive paper most often used in facsimile applications is of the type described in U.S. Pat. Nos. 3,368,918—Miro et al., 3,511,700—Miro and 3,920,873—Diamond. In such papers, an opaque, nonconducting surface coating of the paper is selectively removed by the passage of a modulated electric current to expose a subsurface, conducting layer having a contrasting color. Electrosensitive paper of this type is particularly difficult to feed from a stack under low humidity conditions because of the build-up of triboelectric charge on the paper.

In ordinary paper, a build-up of static electric charge is avoided by the use of conductive adducts such as metal salts. Alternatively, hygroscopic agents have been employed to absorb the moisture and, thus, to dissipate the charge. Those skilled in the art will recognize that the nature of the electrical conductivity of the various layers of electrosensitive paper is crucial to satisfactory performance. In this regard, it is important to remember that marking on electrosensitive paper is achieved by the selective removal of the opaque, nonconducting outer layer which is accomplished essentially by a process analogous to resistance heating. Any additive to an electrosensitive paper which interfers with the needed resistance and the electrical character of the paper will necessarily adversely affect the marking quality of the electrosensitive paper. For example, one would avoid the use of additives which substantially increase the conductivity of the nonconducting layer. Whereas such additives might be desirable in electrochemical paper wherein conductivity is necessary for the passage of electric current to initiate an electrochemical reaction, increases in conductivity in electrosensitive paper of the type here contemplated, which impair the selective removal of the opaque nonconducting outer layer, are detrimental. See U.S. Pat. Nos. 3,011,918—Silvernail, 3,991,256—Cornier and 4,035,244—Inque wherein electrochemical papers with polymeric quaternary ammonium salts added for conductivity are disclosed.

SUMMARY OF THE INVENTION

It is an object of this invention to provide an improved system for the reliable feeding of sheets.

It is a more specific object of this invention to provide an improved system for reliably sheet feeding under a wide variety of conditions including widely varying humidity.

It is a further specific object of this invention to provide a system for reliably sheet feeding sheets comprising electrosensitive paper without impairing the writing or printing quality of the paper.

It is a further specific object of this invention to provide an improved system for reliably sheet feeding in a facsimile apparatus.

In accordance with these and other objects of the invention, a preferred embodiment of the invention comprises a system including a stack of sheets, sheet separating means adapted to successively contact the uppermost sheets in the stack as the uppermost sheets are removed from the stack and separating means including a surface in frictional engagement with the uppermost surface of the uppermost sheets. Drive means moves the frictionally engaging surface of the separating means in a direction substantially parallel to the sheets in the stack so as to pull each of the uppermost sheets from the stack in a direction substantially parallel with the uppermost plane of the stack such that the pulling force is substantially equal on each of the uppermost sheets and sufficient to overcome the frictional force between the uppermost sheets and the sheets beneath the uppermost sheets. In accordance with this invention, the sheets in the stack carry an antistatic electricity additive for substantially minimizing the electrostatic attractive forces between the sheets so as to substantially equalize the pulling force required to separate the uppermost sheets from the sheets beneath regardless of atmospheric conditions.

In a preferred embodiment of the invention, the system includes a stylus adapted to apply a marking current to each of the sheets in the stack and each of the sheets is electrosensitive so as to be marked by the passage of an electric current from the stylus. For this purpose, for example, each of the sheets may comprise a base support layer, a dark colored conductive layer on said support layer and a contrasting light colored opaque layer on said conductive layer. The light colored opaque layer is combustible or removable at a temperature developed during passage of a marking current from the stylus through the sheet.

In accordance with this invention, the surface of the sheet adjacent the light colored layer comprises an antistatic electricity additive. Preferably, the antistatic electricity additive comprises a compound chosen from the group consisting of:

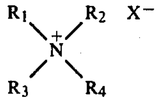

I.

Where $R_1$ and $R_2$ may have from 1 to about 6 carbon atoms, $R_3$ and $R_4$ may have from about 7 to about 30 carbon atoms and X is a monovalent anion. In a preferred embodiment of the invention, $R_1$ and $R_2$ may have from 1 to about 3 carbon atoms, $R_3$ and $R_4$ may have about 12 to about 25 carbon atoms and X may be a halogen anion. In a particularly preferred embodiment of the invention, the compound is dimethyl,ditallow ammonium chloride.

In accordance with another important aspect of the invention, the sheet may comprise a lubricant in the surface of the sheet adjacent the base support layer. A lubricant may be applied to the base support in the form of a coating on the base support. Preferrably, the lubricant comprises a divalent metal salt of a saturated fatty acid having a melting point greater than about 30° C.; the fatty acid may have from about 10 to about 24 carbon atoms. Preferably, the metal salt comprises a zinc salt such as zinc stearate.

DETAILED DESCRIPTION OF A PREFERRED EMBODIMENT

Figure 1:
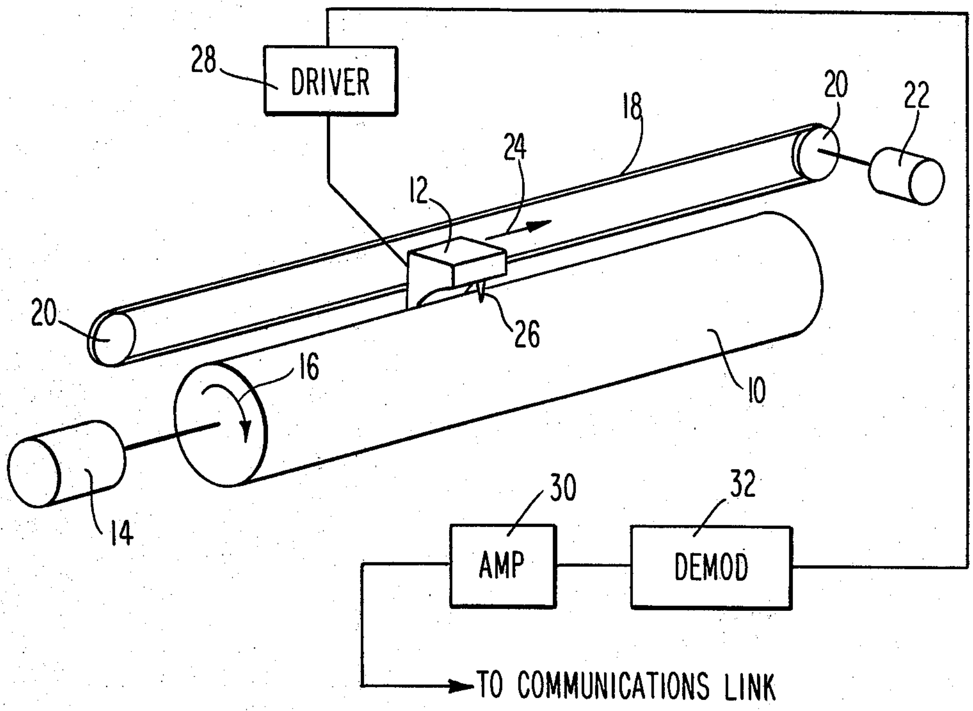
FIG. 1 is a partially schematic block diagram illustrating a facsimile receiver which may embody the invention.

Referring to FIG. 1, a facsimile receiver is shown comprising scanning means including a rotatable drum 10 and a moving scanning head 12. The drum 10 is coupled to a motor 14 so as to rotate the drum 10 in a direction indicated by an arrow 16. The head 12 is mounted on a band 18 which is supported by pullies 20 which are drive by a motor 22 so as to create a linear movement of the head 12 in a direction indicated by an arrow 24.

As the drum 10 rotates and the head 12 moves, successive lines of a copy medium mounted on the drum 10 are scanned by the head 12. As this scanning occurs, a stylus 26 carried by the head 12 is selectively energized by a driver 28 so as to mark the copy medium. The driver 28 is under the control of information-bearing signals which are received from an appropriate communications link such as a telephone network. These information signals are first amplified by an amplifier 30 and then demodulated by a demodulator 32 which is coupled to and controls the driver 28. The actual marking by the stylus 26 will be described subsequently in greater detail with reference to FIG. 4.

Figure 2:
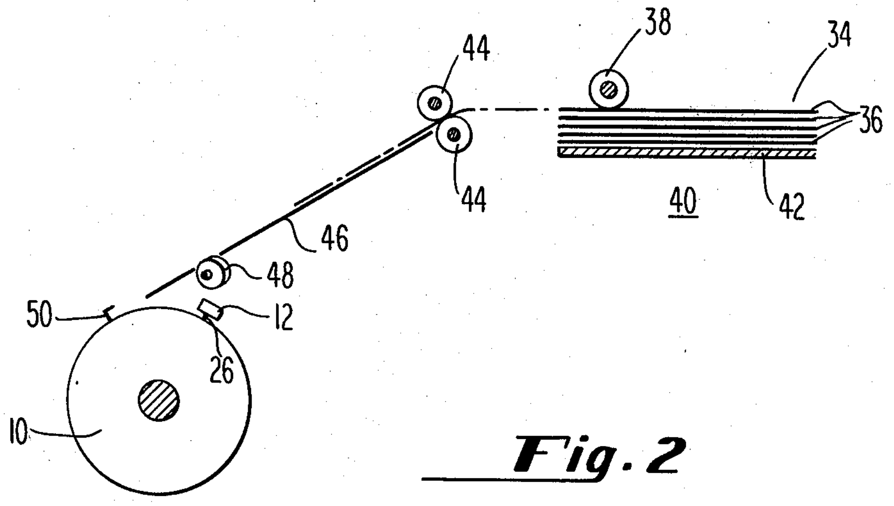
FIG. 2 is a sectional view through a facsimile receiver embodying the invention.

In accordance with this invention, the copy medium is applied to the drum 10 as shown in FIG. 2 by feeding individual sheets of the copy medium from a stack 34 of sheets 36. In accordance with this invention, the sheets 36 are removed from the stack 34 by pulling the uppermost sheet 36 in the stack 34 in a direction generally parallel with the uppermost sheet is the stack by applying substantially equal pulling forces on the uppermost sheet 36 which are sufficient to overcome the frictional force between the uppermost sheet and the sheet immediately beneath the uppermost sheet. This is accomplished by the use of a scuff roller 38.

However, under certain circumstances, the static electricity charge build-up on the sheets 36 in the stack 34 may make it exceedingly difficult to separate these sheets 36 by means of the scuff roller 38. Therefore, in accordance with this invention, an anti-static electricity additive is applied to each sheet 36 in the stack 34. Not only does the use of such an additive minimize the amount of force which must be generated by the scuff roller 38, the additive also substantially equalizes the pulling force which must be applied by the scuff roller 38 on each of the sheets 36 regardless of the atmospheric conditions. As a result, the sheets 36 in the stack 34 may be reliably fed from the sheet storage area 40 in which the stack 34 is located. As shown in FIG. 2, the sheet storage area 40 includes a support plate 42.

Once the sheets 36 leave the sheet storage area 40, they are engaged by a pair of drive rollers 44 rotating in clockwise and counter-clockwise directions respectively and at different speeds so as to assure the further separation of any two sheets 36 which may have advanced simultaneously to the drive rollers 44. The sheets 36 then advance down a chute 46 to yet another roller 48 which properly locates the sheets 36 and drives the sheets into a clamp 50 on the drum 10.

In accordance with another important aspect of this invention, the sheets 36 carry a lubricant on the underside which is adapted to contact the chute 36. This lubricant increases the reliability of the feeding of the sheets 36 toward the drum 10. Not only does the lubricant assist in separating the sheets 36 from one another in the stack 34, but the lubricant also assures the proper advancement of the sheets 36 down the chute 46. Moreover, in the preferred embodiment of the invention, the lubricant is believed actually to be transferred from the sheets 36 to the chute 46 so as, in effect, to prelubricate the chute 46 for each of the sheets 36.

Figure 3:
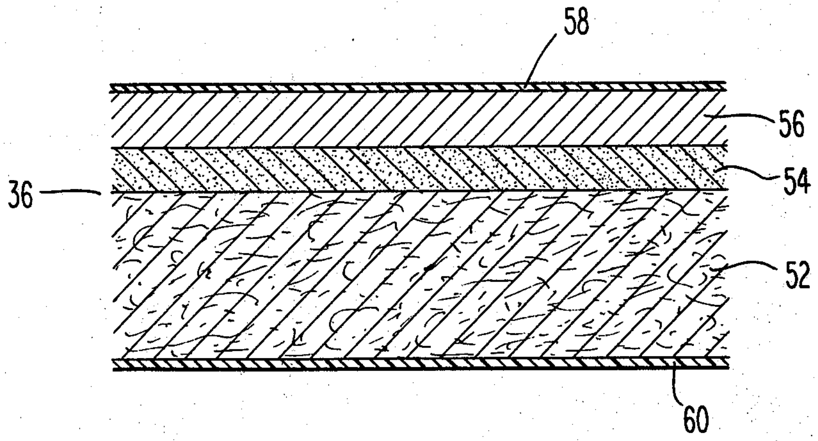
FIG. 3 is a sectional view of a sheet utilized in the embodiment of FIG. 2.

Reference will now be made to FIG. 3 for an understanding of how the antistatic electricity additive and the lubricant are carried by each of the sheets 36. A substrate 52 which may comprise paper or another suitable material is overlaid with a conductive layer 54. An opaque layer 56 is overlaid on the conductive layer 54 and is relatively light in color as compared with the conductive layer 54. This produces the necessary contrast required for writing or marking purposes. Preferably, the conductive layer 54 is black while the opaque layer 56 is substantially white, however other contrasting shades are useful as well.

In accordance with one important aspect of the invention heretofore described, an antistatic electricity additive is located at a surface 58 of the sheet 36 on or in the opaque laye 56. In accordance with another important aspect of the invention, the sheet 36 comprises a lubricant which is shown in FIG. 3 as being located on the back surface 60 of the sheet 36.

Figure 4:
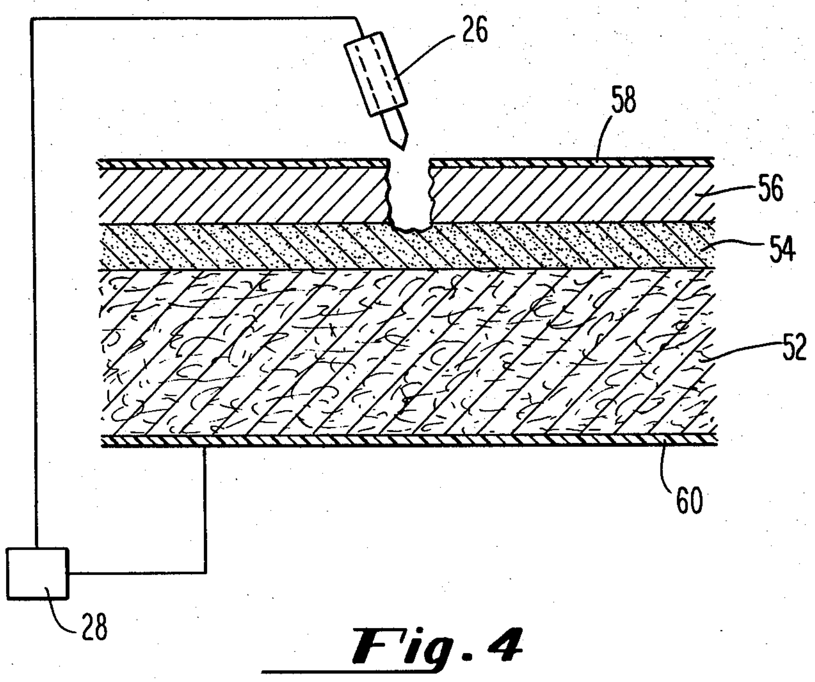
FIG. 4 is a sectional view of the sheet of FIG. 3 during marking in the facsimile receiver of FIGS. 1 and 2.

In FIG. 4, a portion of the layer 56 is shown as having been, in effect, burned away by the stylus 26 so as to expose a portion of the relatively dark conductive layer 54. The current necessary to accomplish this burning away or combustion is provided by the driver 28; the current flows in response to a voltage differential between the top surface and the back surface of the sheet 36.

As shown in FIGS. 3 and 4, the sheet 36 represents electrosensitive paper having essentially 3 layers apart from any layer created by the antistatic electricity additive or the lubricant. It will of course be appreciated that electrosensitive papers exist with varying numbers of layers and such electrosensitive papers are contemplated herein for use in connection with the antistatic electricity additive and the lubricant. Reference is again made to copending application Ser. No. 120,337 which clarifies the relationship of such sheets with facsimile recording apparatus which is incorporated herein by reference.

The antistatic agents which have been found to be useful in the practice of this invention conform to the general formula:

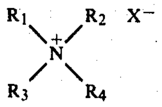

I.

Where $R_1$ and $R_2$ may be the same or different and are alkyl groups having from 1 to about 7 and preferably from one to about three carbon atoms, $R_3$ and $R_4$ are either the same or different and are alkyl groups having from about 7 to about 30 and preferrably from about 12 to about 25 carbon atoms, and where X is a monovalent anion, preferrably a halogen, and more preferably chloride. A preferred anti-static agent for use in these systems is known as dimethyl ditallow ammonium chloride and is believed to comprise a mixture of compounds having formulas represented by (I) wherein $R_3$ and $R_4$ are various hydrocarbyl groups having from about 12 to about 25 carbon atoms therein, where $R_1$ and $R_2$ are both methyl, and where X is chloride.

The lubricants which have been found to be suitable for inclusion in the electrosensitive systems taught herein may be defined as being divalent metal salts of a saturated fatty acid which salts have melting points greater than about 30° C. Exemplary lubricants of this class are the zinc, magnesium, and calcium salts of the $C_{10}$ to $C_{24}$ saturated fatty acids. More preferrably, the lubricant comprises a zinc salt of a $C_{16}$ to $C_{20}$ fatty acid or a mixture thereof. Zinc stearate is most preferred for many applications.

The antistatic compositions of this invention may either be applied as a coating to electrosensitive paper or may be included as a constituent of one or more layers thereof. It will be appreciated that the compositions, if applied as coatings, may either reside on one or more surfaces of the paper so as to comprise an effective coating or layer as suggested in FIG. 3, or the coating may, in greater or lesser degree, be absorbed into one or more surface layers. The antistatic composition may be applied by coating to the "top" or opaque layer of electrosensitive paper. It has been found that such top coating is sufficient to promote free feeding of the paper without need for coating on both "top" and "back" surfaces. It is believed that the antistatic compositions taught herein are partially transferred by physical contact to adjacent paper sheets and to the metal and plastic structures comprising the transport mechanism of the paper feed apparatus. Thus, accumulation of triboelectric charge is frustrated at all stages of the paper feeding process. According to a preferred embodiment, the antistatic agent is included as a component of the opaque layer.

The lubricant compositions disclosed herein are preferably applied to one surface of the electrosensitive paper. Thus, as indicated in FIG. 3, zinc stearate or other lubricants or mixtures thereof according to this invention is applied in a coating formulation to the "back" of the electrosensitive sheet. As with the antistatic agent, some of the back coating may be absorbed into the layers of the article. With the lubricant, however, some effective amount should be present on the surface so as to provide effective lubrication to the paper during feeding. It has been found that this requirement is met by those lubricants which are solid at about room temperature or about 30° C.

Electrosensitive papers having both antistatic agent and lubricant according to the invention have been found to exhibit superior performance in automatic feeding operations; the lubricant and anti-static agent exist in a serendipidous relationship whereby their respective functions are maintained without loss of performance in the system as a whole.

Examples 1-3 present formulations which are suitable for use as topcoatings to form an opaque layer 58 on electrosensitive paper. Such formulations are applied in any of the ways well known to those skilled in the art such as by roller coating or wire rod coating; each performs well in automated paper feeding over a wide range of humidities and conditions.

Example 1

| Parts by Weight | |
|---|---|
| 35 | Butvar B-79 (Shawinigan Resins Corp.) |
| 15 | ½ Sec. SS Nitrocellulose |
| 12.5 | Tricresyl Phosphate |
| 45 | Zinc Oxide |
| 90 | Zinc Sulfide |
| 300 | Methanol |
| 2.5-50 | Dimethyl, ditallow quaternary ammonium chloride |

Example 2

| Parts by Weight | |
|---|---|
| 10 | Ethyl Cellulose |
| 30 | Butvar B-72A (Shawinigan Resins Corp.) |
| 12.5 | Dioctyl Phthlate |
| 10 | Pentalyn 255 (Hercules Corp.) |
| 45 | Zinc Oxide |
| 90 | Zinc Sulfide |
| 300 | Methanol |
| 2.5-55 | Dimethyl, ditallow quaternary ammonium chloride |

Example 3

| Parts by Weight | |
|---|---|
| 40 | Alcohol Soluble butyrate |
| 13.3 | Tricresyl Phosphate |
| 100 | Zinc Oxide |
| 40 | Zinc Sulfide |
| 359 | Methanol |
| 2.5-55 | Dimethyl, ditallow quaternary ammonium chloride |

As will be apparent to those skilled in the art, similar opaque coating compositions which employ other polymer such as, for example, n-butyl methacrylate, polyvinyl acetate, methyl methacrylate, cellulose acetate etc. It will also be apparent that other pigments such as titanium dioxide, lithopore, calcium carbonate etc. may be employed.

Examples 4 and 5 illustrate back coating compositions for formation of back coatings 60 which include a lubricant in accordance with a preferred form of the invention. Any suitable means for coating such as wire rod coating will serve for elaborating layer 60 from these compositions. Each coating works well in automated feeding operations especially when used in conjunction with one of the antistatic opaque coatings of Examples 1-3.

Example 4

-continued

| | |
|---|---|
| Parts by weight | |
| 100 | #2 coating clay |
| 40 | Vinac 881 (45% N.V.) |
| 0.06 | Tetrasodium pyrophosphate |
| 56.7 | Water |
| 1.4-28 | Zinc Stearate |
| Example 5 | |
| Parts by weight | |
| 100 | #1 coating clay |
| 43.5 | Rhoplex AC 33 (46% N.V.) |
| 0.08 | Sodium hexametaphosphate |
| 56.5 | Water |
| 1.4-28 | Zinc Stearate |

The foregoing examples illustrate certain preferred embodiments of the present invention; those skilled in the art will appreciate that they are intended to be illustrative only and that no limitation is to be inferred therefrom.

What is claimed is:

1. A facsimile system comprising:
scanning means;
sheet storage means;
a stack of sheets in said storage means;
each of said sheets comprising a spark-discharge medium including:
a base support;
a dark colored conductive layer on said support and
a contrasting light colored layer on said conductive layer combustible at the temperature developed during passage of marking current through each of said sheets;
sheet separating means adapted to successively contact the uppermost of said sheets in said stack as said uppermost sheets are removed from said stack, said separating means including a surface in frictional engagement with an uppermost surface of said sheet;
drive means for moving said surface in a direction substantially parallel to the sheets in said stack so as to pull each of said uppermost sheets from said stack in a direction generally parallel with the uppermost sheet in said stack, said pulling force being substantially equal on each of the uppermost sheets and sufficient to overcome the frictional force between the uppermost sheets and the sheets beneath the uppermost sheets;
each of said sheets in said stack carrying an anti-static electricity additive for substantially minimizing the electrostatic attractive force between said sheets so as to substantially equalize said pulling force required to separate the uppermost sheets from the sheets beneath regardless of atmospheric conditions; and means for transporting said sheets from said storage means to said scanning means.

2. The system of claim 1 further comprising a stylus adapted to apply a marking current to each of said sheets at said scanning means.

3. The system of claim 1 wherein said antistatic electricity additive is contained in said light colored layer at the surface hereof.

4. The system of claim 3 further comprising a lubricant layer on the surface of said medium.

5. The system of claim 4 further comprising guide means for supporting each of said sheets as said sheets move from said storage means to said scanning means, said lubricant layer contacting said guide means.

6. A system for sheet feeding comprising:
a stack of sheets;
each of said sheets comprising a spark-discharge medium comprising:
a base support;
a dark colored conductive layer on said support; and
a contrasting light colored opaque layer on said conductive layer combustible at a temperature developed during passage of marking current through each of said sheets;
sheet separating means adapted to successively contact the uppermost of said sheets in said stack as said uppermost sheets are removed from said stack, said separating means including a surface in frictional engagement with an uppermost surface of said sheets;
drive means for moving said surface in a direction substantially parallel to the sheets in said stack so as to pull each of said uppermost sheets from said stack in a direction substantially parallel with said stack, said pulling force being substantially equal on each of the uppermost sheets and sufficient to overcome the frictional force between the uppermost sheets and the sheets beneath the uppermost sheets;
each of the sheets in the stack carrying an antistatic electricity additive for substantially minimizing the electrostatic attractive forces between the sheets so as to substantially equalize the pulling force required to separate the uppermost sheets from the sheets beneath regardless of atmospheric conditions.

7. The system of claim 6 further comprising a stylus adapted to apply a marking current to each of said sheets in said stack.

8. The system of claim 6 wherein said antistatic electricity additive is contained in said light colored layer.

9. The system of claim 8 further comprising a lubricant applied to a surface of said medium.

10. The system of claim 9 further comprising guide means adapted to support said sheets in contact with said lubricant layer.

* * * * *